United States Patent [19]

Nagashima

[11] Patent Number: 4,993,865
[45] Date of Patent: Feb. 19, 1991

[54] FLYWHEEL MOUNTING DEVICE FOR INTERNAL COMBUSTION ENGINE

[75] Inventor: Akira Nagashima, Kawasaki, Japan

[73] Assignee: Kioritz Corporation, Tokyo, Japan

[21] Appl. No.: 41,733

[22] Filed: Apr. 22, 1987

[30] Foreign Application Priority Data

Apr. 23, 1986 [JP] Japan ............... 61-61588[U]

[51] Int. Cl.⁵ .................................. F16B 3/00
[52] U.S. Cl. ................... 403/358; 403/259; 403/318; 74/572
[58] Field of Search ............ 403/356, 358, 318, 319, 403/259, 261, 254, 253, 256, 16, 371, 355; 74/572

[56] References Cited

U.S. PATENT DOCUMENTS

| | | | |
|---|---|---|---|
| 1,393,610 | 10/1921 | Candee | 403/358 X |
| 1,495,654 | 5/1924 | Tietz, Jr. | 403/358 X |
| 1,552,343 | 9/1925 | Quinn et al. | 403/358 X |
| 1,797,296 | 3/1931 | Ray | 403/259 |
| 2,659,244 | 11/1953 | Guy | 74/572 |
| 2,823,053 | 2/1958 | Strange | 403/355 |
| 3,877,827 | 4/1975 | Adelizzi | 403/356 X |
| 4,144,755 | 3/1979 | Palloch | 403/16 X |
| 4,285,305 | 8/1981 | Kaufman et al. | 403/356 X |
| 4,373,831 | 2/1983 | Crawford | 403/358 X |
| 4,520,688 | 6/1985 | Ban | 74/572 |
| 4,525,095 | 6/1985 | Lamb et al. | 403/358 X |
| 4,572,698 | 2/1986 | Rauch | 403/356 |
| 4,695,183 | 9/1987 | Greenberg | 403/356 |

Primary Examiner—Peter M. Cuomo
Attorney, Agent, or Firm—Browdy and Neimark

[57] ABSTRACT

Disclosed is a flywheel mounting device for an internal combustion engine in which a keyway extends along the tapered surface of a flywheel in the axial direction from the small diameter end portion thereof and terminates at an intermediate portion thereof, so that the tapered surfaces of the crank shaft and the flywheel are closely fitted together over the entire periphery thereof at the large diameter end portions thereof.

2 Claims, 6 Drawing Sheets

FLYWHEEL MOUNTING DEVICE FOR INTERNAL COMBUSTION ENGINE

BACKGROUND OF THE INVENTION

1. FIELD OF THE INVENTION

The present invention relates to a flywheel mounting device for an internal combustion engine which is of the type in which the outer peripheral surface of an end portion of a crank shaft of the internal combustion engine is tapered while the inner peripheral surface of a central hole of a flywheel is tapered to form a shape which fits onto the tapered surface of the crank shaft, in which a keyway is formed in the axial direction on each of the tapered surfaces of the crank shaft and flywheel, and in which a key is disposed in the keyway to allow the flywheel to be mounted on the crank shaft. More particularly, the present invention concerns a flywheel mounting device for an internal combustion engine suitable for use in a working machine such as a chain saw.

2. DESCRIPTION OF THE PRIOR ART

In conventional flywheel mounting devices of internal combustion engines of this type, a keyway is formed in the axial direction over the entire length of the tapered inner peripheral surface of the flywheel. As a result, the flywheel is spaced away from the crank shaft at the portion of the keyway at the large diameter end portion of the tapered surface thereof, and the flywheel and the crank shaft therefore do not fit each other along the entire periphery thereof at the large diameter end portions of their tapered surfaces.

In such a flywheel mounting device, since the keyway extends along the tapered surface of the flywheel as far as the large diameter end portion thereof, the coupling portions of the crank shaft and the flywheel may break due to fretting during the rotation of the crank shaft.

SUMMARY OF THE INVENTION

Accordingly, an object of the present invention is to provide a flywheel mounting device suitable for use in a small output internal combustion engine which is capable of overcoming the above noted problem of the prior art.

To this end, according to the present invention, there is provided a flywheel mounting device for an internal combustion engine which is characterized in that a keyway extends in the axial direction along a tapered surface of a flywheel from the small diameter end portion thereof and terminates at an intermediate portion thereof in the axial direction, such that the tapered surfaces of the crank shaft and the flywheel are closely fitted together along the entire periphery thereof at the large diameter end portions of the tapered surfaces.

In consequence, with the above-described arrangement, the large diameter end portions of the tapered surfaces which are subject to fretting are fitted together along the entire periphery thereof. As a result, concentration of stress can be eliminated, and the crank shaft and the flywheel exhibit no unevenness. More specifically, breakage of the crank shaft and the flywheel due to fretting can be prevented. The crank shaft and the flywheel can be fitted uniformly over the entire periphery thereof, preventing local generation of an excessive load. Also, this enables the mounting device to have a thinner wall and to become lighter in weight without use of any special material.

DESCRIPTION OF THE PREFERRED EMBODIMENT

An embodiment of a chain saw of the present invention will be described hereinunder with reference to the accompanying drawings.

Figure 1:
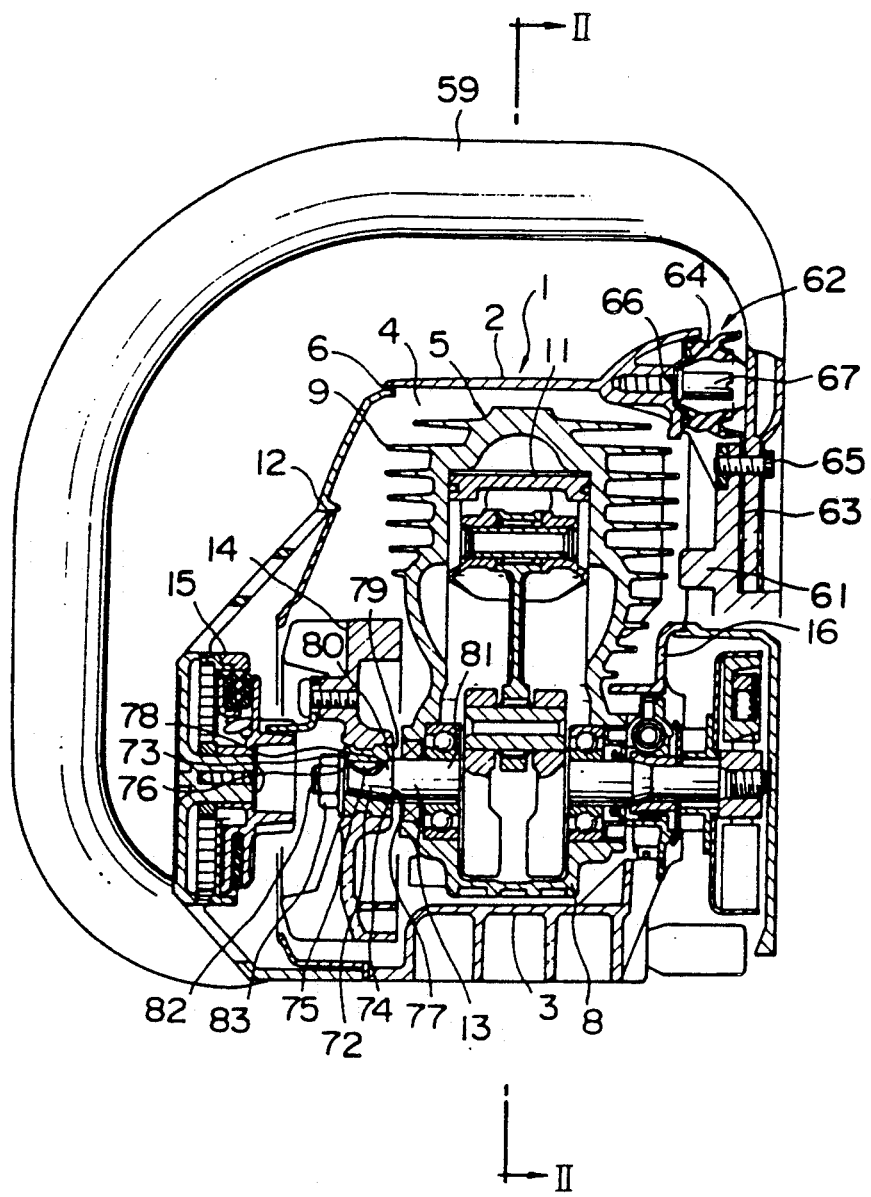
FIG. 1 is a vertical cross-sectional view along a crank shaft of an embodiment of the present invention.
Figure 2:
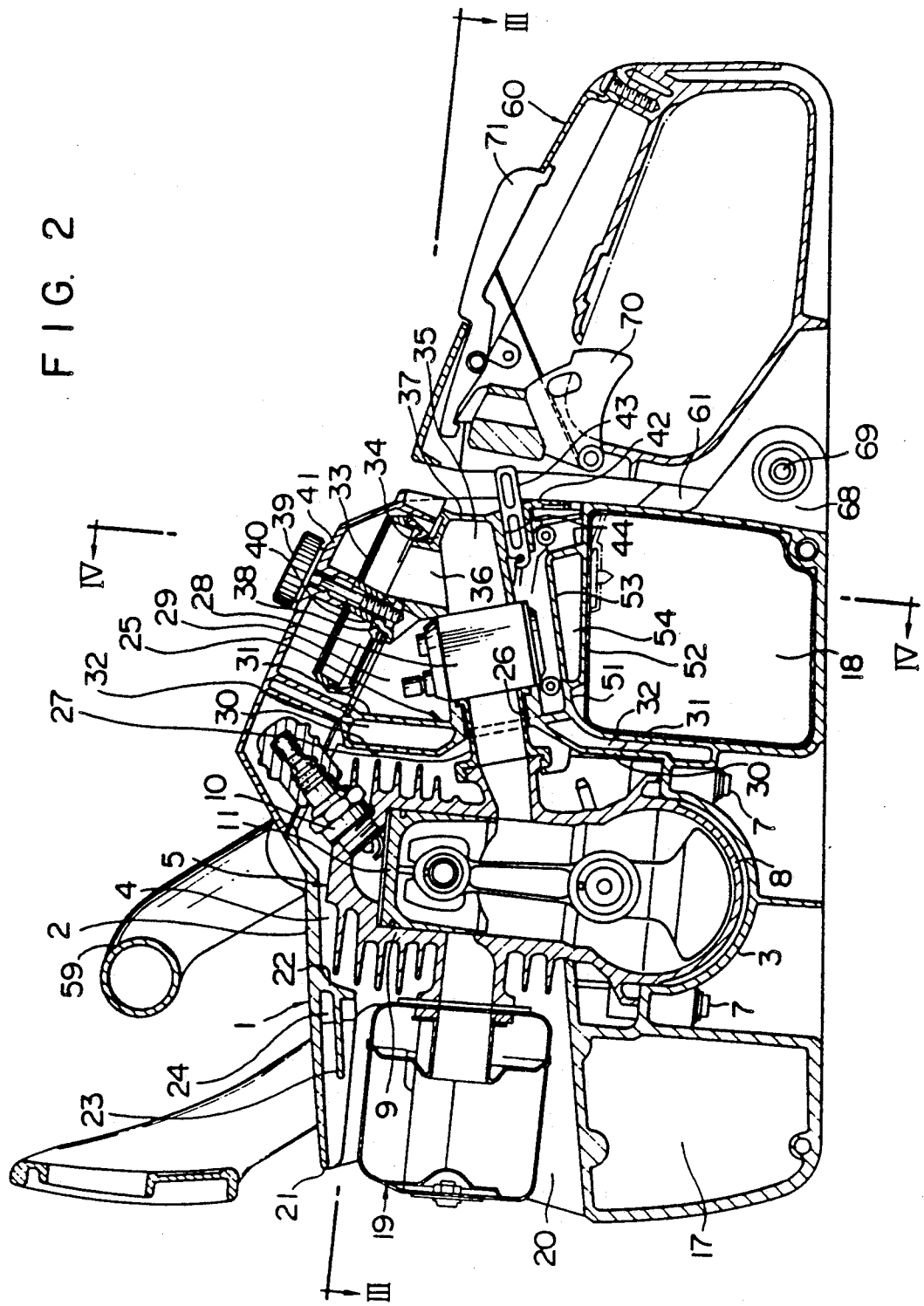
FIG. 2 is a vertical cross-section taken along the line II—II of FIG. 1 as seen when looking in the direction of the arrows.

The chain saw has a main body 1 which is of an integrally molded synthetic resin such as nylon, as shown in FIGS. 1 and 2. The body 1 includes an upper wall portion 2 and a bottom wall portion 3, the interior of which defines an internal combustion engine chamber 4 for accommodating an internal combustion engine 5. The internal combustion engine 5 is inserted in the internal combustion engine chamber 4 from a left side 6 which is open, and is fixed onto the bottom wall portion 3 by means of a plurality of bolts 7 screwed from the underside of the body 1. The internal combustion engine 5 of this embodiment is represented by a forced air-cooling two-cycle gas-fueled engine. The engine 5 has a crank case 8, and is supported on the bottom wall portion 3 of the body 1 at the center of the longitudinal length of the crank case 8. The engine 5 also has a vertical cylinder 9 extending upward in the internal combustion engine chamber 4, an ignition plug 10 mounted on the upper end of the cylinder 9, and a piston 11 disposed within the cylinder 9 in such a manner as to be movable reciprocally in the vertical direction. The left side 6 of the body 1 is covered by a removably mounted cover 12. Inside the cover 12 are disposed a flywheel/cooling fan 14 coupled with a crank shaft 13 of the internal combustion engine 5 in a manner to be described later and a recoil starter 15 mounted on the cover 12 and coupled to the flywheel/cooling fan 14. The periphery of the flywheel/cooling fan 14 is provided with a permanent magnet so that it also functions as a magnet rotor of the ignition device of the internal combustion engine 5. The right side of the body 1 is constituted by a side wall 16 opposite the left side 6.

The body 1 also defines a saw chain lubricant tank chamber 17 at the front of the crank case 8 of the internal combustion engine 5, and a fuel tank chamber 18 at the back thereof. A left side opening of the lubricant tank chamber 17 may be closed by adhering thereto a separately provided lid plate. A tank having a relatively thin wall and formed by a synthetic resin blowing process may be inserted in the fuel tank chamber 18 from a left side opening thereof. The body 1 also defines above the lubricant tank chamber 17, a muffler chamber 20 which accommodates a muffler 19 connected to the exhaust port of the cylinder 9 of the internal combustion engine 5 and extending therefrom in the forward direction. The muffler chamber 20 is open to the outside at a forward end thereof, i.e., an external end 21 thereof, and communicates with the internal combustion engine 5 chamber 4 at a rear end thereof, i.e., an internal end thereof.

The upper wall portion 2 of the body q has an inwardly protruding bracket wall portion 22 integrally formed therewith between the internal combustion engine chamber 4 and the muffle chamber 20. An inner wall portion 23 is formed with the bracket wall portion 22 as a unit in such a manner that it extends into the upper portion of the muffler chamber 20 at a position spaced apart from the upper wall portion 2 in the inward direction and substantially parallel thereto. The bracket wall portion 22 and the inner wall portion 23, together with the upper wall portion 2, provide a double wall structure with a heat insulation space 24 formed therebetween. This is effective in minimizing the transmission of heat emanated from the cylinder 9 of the internal combustion engine 5 and the muffler 19 to the outside through the upper wall portion 2. It is also advantageous in increasing the structural strength of the chain saw.

The body 1 has an intermediate wall portion 25 formed integrally therewith. The intermediate wall portion 25 extends between the right and left sides of the body 1 at the rear of the internal combustion engine chamber 4. It has a circular opening 26 at the substantially central portion thereof, through which a duct 27 made of synthetic rubber is passed. One end of the duct 27 is coupled to the suction port of the cylinder 9 of the internal combustion engine 5, while the other end thereof is connected to the outlet of a carbureter 28. An air-fuel mixture is supplied from the carbureter 28 to the internal combustion engine 5 through this duct 27. The carbureter 28 is mounted at the opening 26 which forms a mounting seat thereof, and is disposed in a carbureter chamber 29 formed above the fuel tank chamber 18 in the body 1 and separated from the internal combustion engine chamber 4 by the intermediate wall portion 25. The intermediate wall portion 25 comprises two double wall portions 30 and 31 which are spaced away from each other and extend in the vertical direction. Each of the double wall portions 30 and 31 forms a heat insulation space 32 therein. The intermediate wall portion 25 thus has a double wall structure, and the transmission of heat emanating from the internal combustion engine chamber 4 can be thereby effectively prevented from reaching the carbureter chamber 29 and the fuel tank chamber 18, and the structural strength and vibration-proof effect of the chain saw can also be increased.

Within the carbureter chamber 29 and in the rear portion of the body 1, an elbow tube 34 connecting the inlet of the carbureter 28 and the outlet of an air cleaner 33 is fixed by means of carbureter mounting bolts. The elbow tube 34 forms therein a horizontal passage portion 35 extending coaxially from the inlet of the carburetor 28, as well as a vertical passage portion 36 extending upward along an axis which crosses the axis of the horizontal passage portion 35 at an angle. One end of the horizontal passage portion 35 is coupled with the inlet of the carbureter 28, while the other end thereof is closed by an end wall 37. The upper end of the vertical passage 36 portion is coupled with the outlet of the air cleaner 33, while the lower end thereof opens into the upper side of the horizontal passage portion 35 at an intermediate portion thereof away from the end wall 37. The upper end of the elbow tube 34 is provided with a bracket portion 38 integrally formed therewith and having a threaded hole 40 thereon into which a thread 39 may be screwed. A cleaner cover 41 and the air cleaner 33 are removably fixed to the body 1 and the elbow tube 34 by screwing this thread 39 into the hole 40 through the cleaner cover 41 and the air cleaner 33. The underside of the end wall 37 of the elbow tube 34 is provided with a bracket portion 42 integrally formed therewith. The bracket portion 42 forms a guide passageway 44 along which a throttle rod 43 of the internal combustion engine 5 is slidably guided in the horizontal direction. With this arrangement of the elbow tube 34, it is possible to prevent any air-fuel mixture from flowing into the air cleaner 33 via the vertical passage portion 36, even if it blows back from the carbureter 28 into the horizontal passage portion 35 of the elbow tube 34 by virtue of the reverse pressure that occurs during the operation of the internal combustion engine 5, and the air cleaner 33 can thus effectively be prevented from becoming dirty. This enables the dimension of the outlet opening of the air cleaner 33 to be made large, increasing the air feeding efficiency thereof. Further, the mounting seat of the air cleaner 33 and the cleaner cover 41 and the guide of the throttle rod 43 are all made as one unit, thereby simplifying the structure and decreasing the size of the device.

Figure 3:
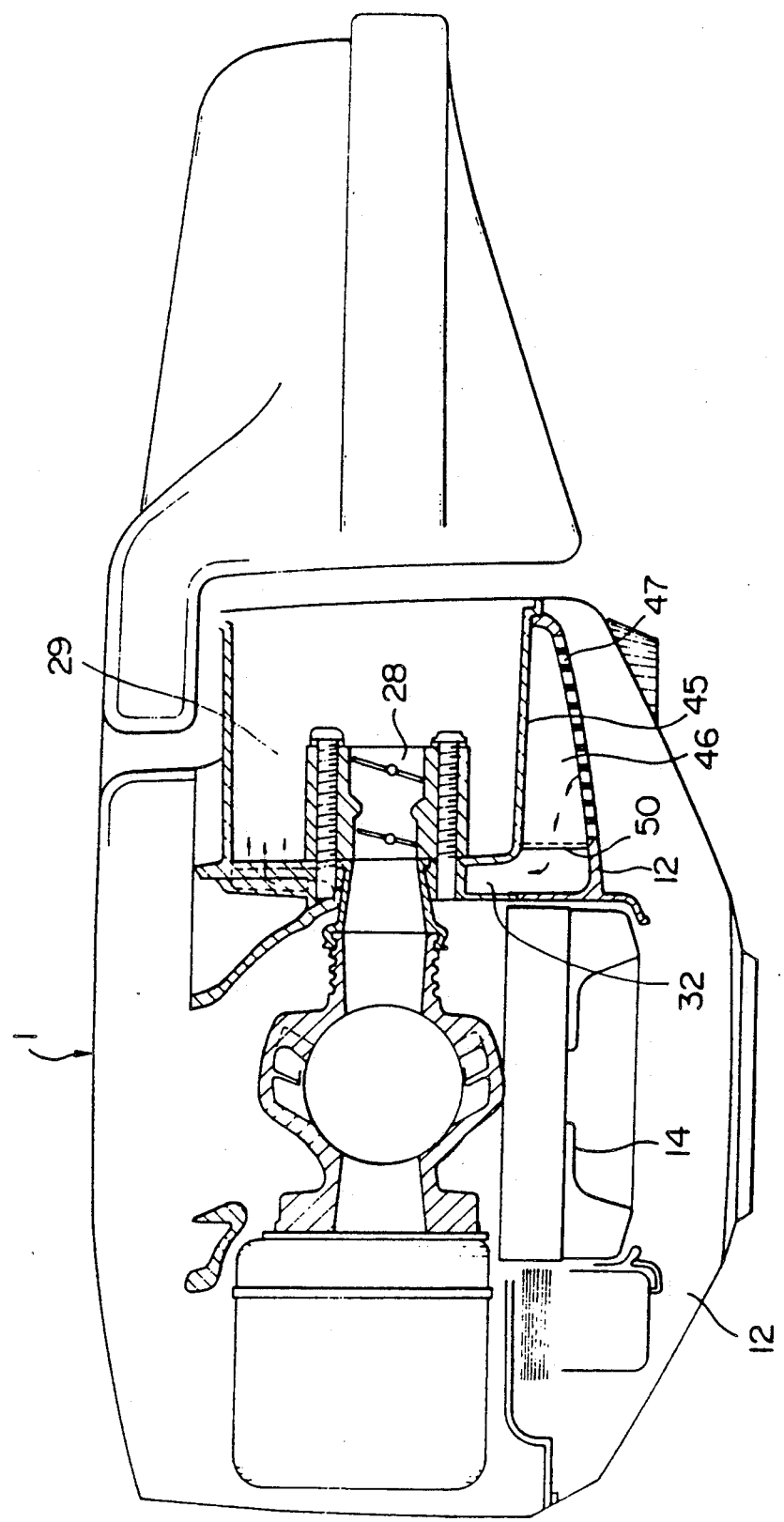
FIG 3 is a horizontal cross-section taken along the line III—III of FIG. 2 as seen when looking in the direction of the arrows.
Figure 4:
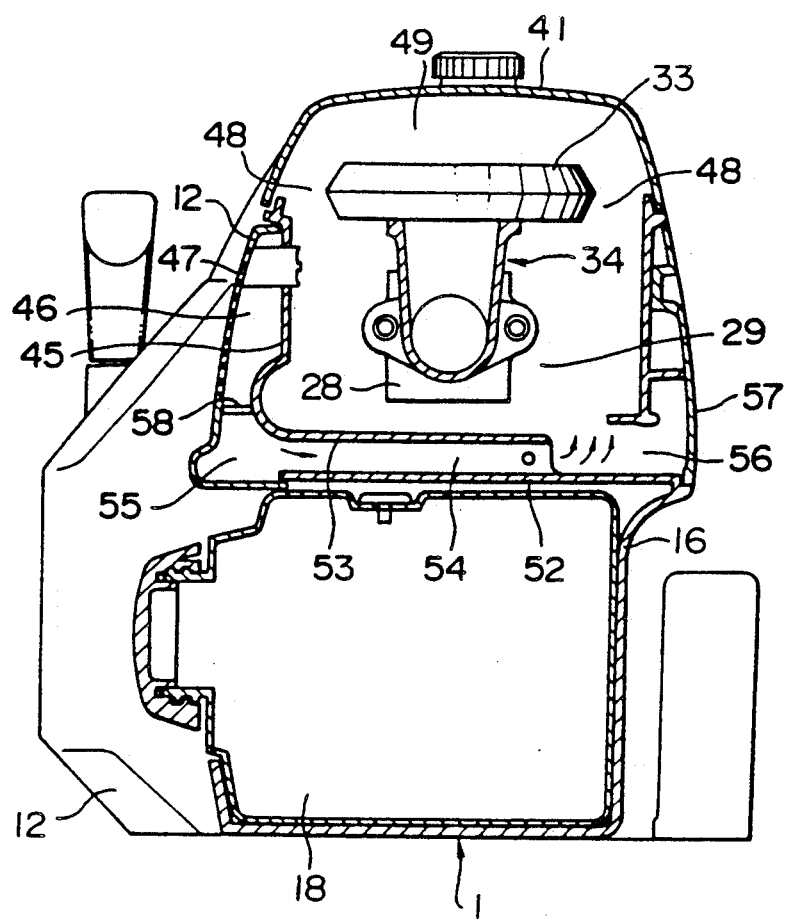
FIG. 4 is a vertical cross-section taken along the line IV—IV of FIG. 2 as seen when looking in the direction of the arrows.
Figure 5:
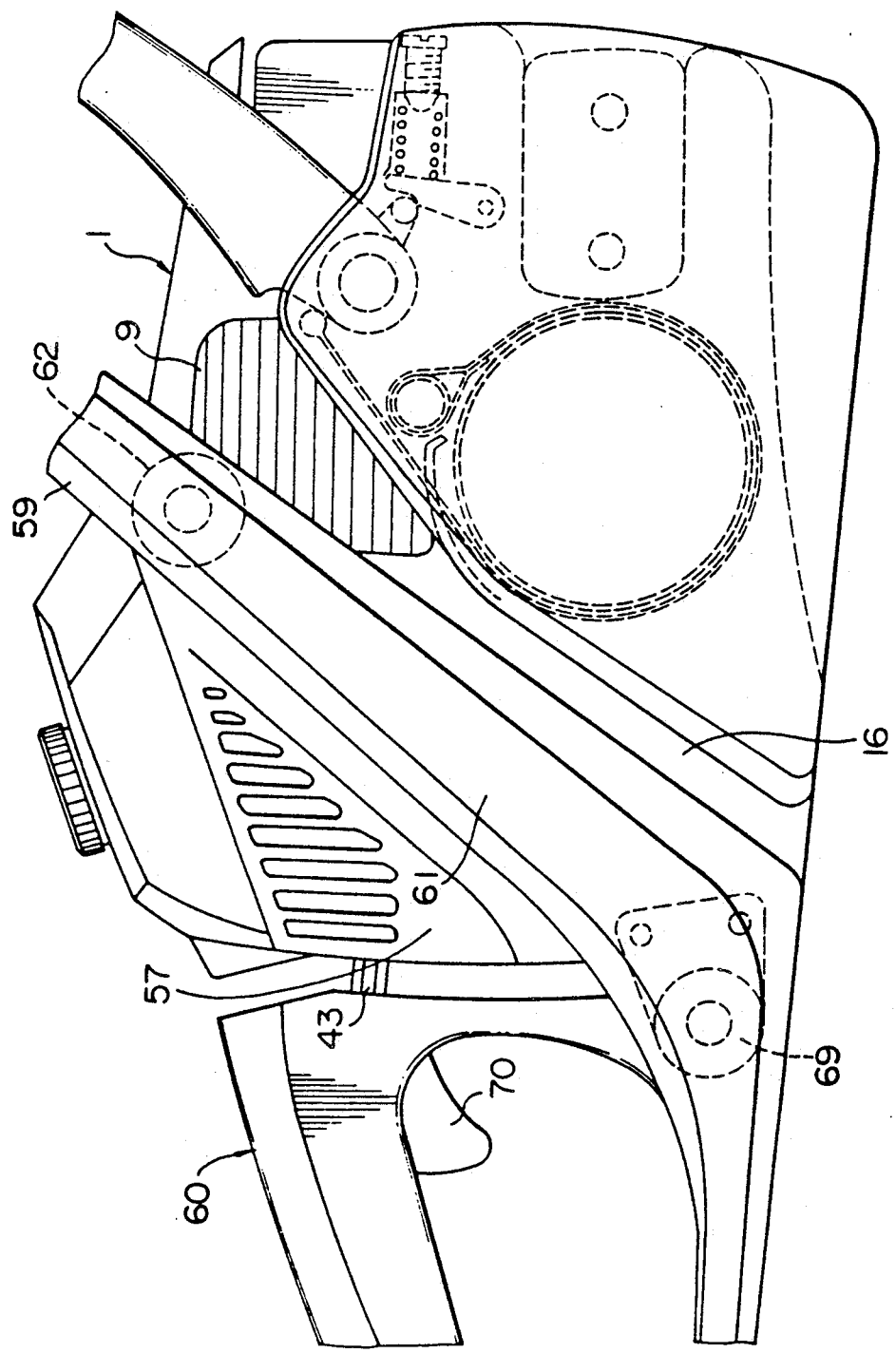
FIG. 5 is a side view of the embodiment of FIG. 1 as seen from the right side with part broken away.

The body 1 has on its left side 6 a side wall portion 45 which is recessed inward and integrally formed with the body 1 (see FIGS. 3 and 4). The side wall portion 45 and the cover 12 together form an air induction space 46 therebetween. Air is introduced into the air induction space 46 through a large number of small holes 47 formed in the cover 12. Relatively large particles of dirt contained in the air are removed as the air passes through the small holes 47. The air induction space 46 communicates at one end thereof with one end of the heat insulation space 32 of the intermediate wall portion 25 of the body 1, and the heat insulation space 32 also opens into the carbureter chamber 29 at the other end thereof. The carbureter chamber 29 communicates with a space 49 in the cleaner cover 41 via a passage 48, and also with the inlet of the air cleaner 33. A first shutter 50 may be removably mounted between the air induction space 46 and the heat insulation space 32 so as to intercept the flow of air therebetween.

The body 1 also has a wall portion 51 (see FIG. 1) integrally formed therewith. The wall portion 51 separates the fuel tank chamber 18 from the carbureter chamber 29, and comprises horizontally extending wall portions 52 and 53 which form a horizontal passage 54 (see FIG. 4) therebetween. The passage 54 communicates with the lower end of the air induction space 46 at one end thereof and with the carbureter chamber 29 at the other end thereof. With this arrangement, the air introduced into the air induction space 46 changes direction about 90 degrees at the lower end thereof, and flows into the passage 54 then into the carbureter chamber 29 before it is supplied to the air cleaner 33 in the manner described above. The lower end of the air induction space 46, at which the direction of air flow is changed, constitutes a dust trap 55. Dust which accumulates here can be easily disposed of by removing the cover 12 from the body 1. Similarly, the area between the passage 54 and the carbureter chamber 29, at which the direction of air flow is changed, constitutes a second dust trap 56. Dust which accumulates here can be easily disposed of by removing a cover 57 from the body 1. A second shutter 58 may be removably mounted at the lower end of the air induction space 46 so as to cut off the air flowing into the passage 54 from the air induction space 46.

When the chain saw is used in an environment in which the ambient air temperature is low, like in winter, the first shutter 50 is removes so that the air induction space 46 and the heat insulation space 32 communicate with each other, and the second shutter 58 is mounted so that the communication between the air induction space 46 and the passage 54 is interrupted. In consequence, the air flowing into the air induction space 46 flows into the heat insulation space 32, at which it is suitably warmed by the heat emanating from the internal combustion engine 5, before flowing into the air cleaner 33 via the carbureter chamber 29, passage 48, and space 49 so as to be cleaned for the last time. This warmed, cleaned air is then supplied to the carbureter 28 via the elbow tube 34, and the air-fuel mixture is supplied from the carbureter 28 to the internal combustion engine 5 via the duct 27, thereby enabling the engine to operate well.

Furthermore, when the chain saw is used in an environment in which the ambient air temperature is high, like in summer, the first shutter 50 is mounted so that the communication between the air induction space 46 and the heat insulation space 32 is interrupted, and the second shutter 58 is removed so that the air induction space 46 and the passage 54 communicate with each other. In consequence, the outside air flows from the air induction space 46 into the carbureter chamber 29 via the passage 54, and then into the air cleaner 33 via the passage 48 and the space 49.

Thus, the air flow passages to the air cleaner 33 can be suitably switched over in accordance with the environment in which the chain saw is used. As a result, the operation of the carbureter 28 can be maintained at an optimum, and intake air noise can be reduced. It is also possible to operate the chain saw in a satisfactory manner when rain or snow is falling.

The chain saw of this embodiment has a front handle 59 and a rear handle 60. As shown in FIG. 2, the upper right end of the front handle 59 is fixed to the upper end of a connecting member 61 integrally formed with the rear handle 60, and is also secured to the upper wall portion 2 of the body 1 through a rubber cushioning member 62. The cushioning member 62 comprises a set portion 63 and an annular rubber portion 64 which are integrally formed with each other. The seat portion 63 is interposed between the front handle 59 and the connecting member 61, and is fixed together with these members by means of a screw 65. The annular rubber portion 64 is fixed to the upper wall portion 2 of the body 1 by means of a screw 67 through a washer 66 plated on one end thereof, while the other end thereof abuts against the front handle 59 so as to elastically support it. Similarly, the left lower end of the front handle 59 is linked to the lower portion of the left side of the body 1 through a cushioning member, although this is not shown.

The connecting member 61 extends toward the lower rear portion of the body 1 at a slant, on the side thereof. The lower rear end of the body 1 is provided with a bracket portion 68 which is integrally formed therewith and which protrudes backward. The lower front end of the rear handle 60 integrally formed with the lower end of the connecting member 61, is disposed on the external side of the bracket portion 68, and the lower front end of the rear handle 60 and the bracket portion 68 are connected to each other by means of a bolt with a suitable cushioning member 69 interposed therebetween. Since the rear handle 60 is thus linked to the body 1 at the front lower end thereof, a trigger for operating the throttle rod 43, a locking device 71 for the trigger 70, and other operating switches can be disposed with a large degree of freedom at the upper portion of the rear handle 60. As a result, the operability and workability of the chain saw can be increased. Further, the rear handle 60 can be disposed very closely to the body 1, and this can reduce the size of the chain saw.

Figure 6:
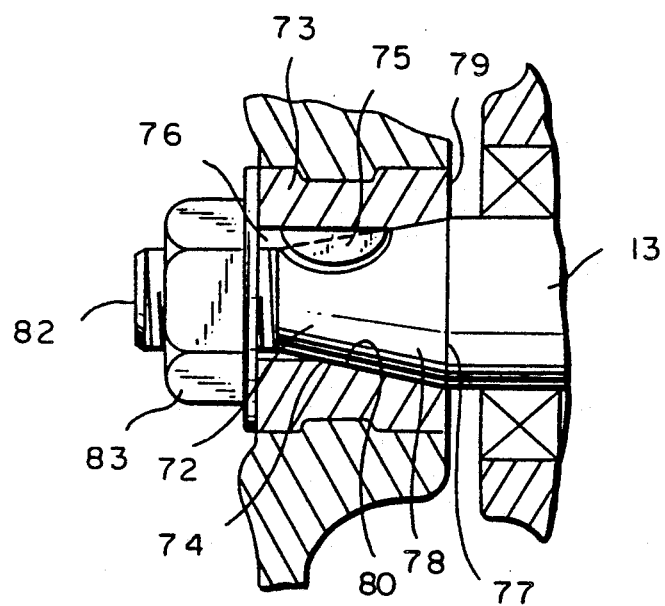
FIG. 6 is an enlarged of the side view of the key arrangement of FIG. 1.

As shown in FIGS. 1 and 6, the outer peripheral surface of an end portion 72 of the crank shaft 13 which fixes the flywheel/cooling fan 14 is tapered in such a manner that the diameter thereof decreases toward the external end thereof. A central hold 74 formed in a central boss portion 73 of the flywheel/cooling fan 14 has an inner peripheral surface which compensates for the tapered surface of the end portion 72 of the crank shaft 13, so that it fits closely onto the end portion 72. The tapered surface of the end portion 72 of the crank shaft 13 is provided with a woodruff key 75 which extends in the axial direction from the external end of the end portion 72, and the portion of the key which protrudes from the tapered surface of the crank shaft 13 fits into a keyway 76 formed on the central hole 74 of the central boss portion 73 of the flywheel/cooling fan 14. The key 75 is disposed in a key way at the central portion of the tapered surface of the end portion 72 of the crank shaft 13 in such a way that a continuous tapered surface 78 is left at the side of an internal large diameter end 77 of the tapered surface of the end portion 72 of the crank shaft 13. On the other hand, the keyway 76 terminated at an intermediate portion of the central hole 74 in such a way that a tapered inner peripheral surface 80, which closely engages with the tapered surface 78 of the end portion 72 of the crank shaft 13, remains at the side of an internal end 79 of the central hold 74 of the central boss portion 73. In this way, the radial distance between the central axis and the bottom of the keyway 76 in the central boss position 73 of the flywheel cooling fan 14 (i.e., this "bottom" being shown at the upper part of the keyway 76 as illustrated in FIG. 1) is made somewhat smaller than the radius of the main portion 781 of the crank shaft 13, so that the end portion 72 of the crank shaft 13 and the central boss portion 73 of the flywheel/cooling fan 14 are closely engaged with each other along an entire periphery of each one thereof, namely at respective parts of the tapered surface 78 and the tapered inner peripheral surface 80 which are located on the right side of the key 75. This can prevent breakage of the coupling portion between the crank shaft 13 and the flywheel/cooling fan 14 due to fretting, also preventing excessive stress from being locally generated in this coupling portion, and so enabling the provision of a chain saw which is small in size and light in weight. This also makes it possible for the chain saw to be manufactured at a relatively low cost. In addition, the flywheel/cooling fan 14 is fixed to the crank shaft 13 by means of a nut 83 screwed onto a threaded portion 82 formed at the far end of the end portion 72 of the crank shaft 13.

The key arrangement described above is shown in an enlarged view in FIG. 6, with the same reference numerals for respective parts as shown in FIG. 1.

What is claimed is:

1. In a flywheel device for an internal combustion engine in which an outer peripheral surface of one end of a crank shaft of the internal combustion engine is tapered while an inner peripheral surface of a central hole of a flywheel is tapered to form a shape which fits onto said tapered surface of said crank shaft, a first keyway being formed along said tapered inner peripheral surface of said flywheel, a second keyway being formed along said tapered outer peripheral surface of said crank shaft, said crank shaft having an axis of rotation, said tapered surfaces being symmetric with respect to said axis of rotation and each said tapered surface having a respective large-diameter end and small-diameter end, and a key being fitted into said keyways to allow said flywheel to be non-rotatably mounted on said crank shaft, an improvement characterized in that said first keyway in said flywheel extends to intersect said tapered inner peripheral surface of said flywheel, said first keyway extending along said inner peripheral surface of said flywheel from said small-diameter end thereof, and wherein said first keyway and said second keyway terminate at respective opposing intermediate portions of said tapered surfaces, respectively, such that said tapered surfaces of said crank shaft and said flywheel are closely fitted together along entire circumferential peripheries thereof extending around said axis of rotation and along a substantial length of adjoining parts of said tapered surfaces on the large-diameter ends thereof from the terminations of said key and keyways at said opposing intermediate portions;

said tapered outer peripheral surface of said crankshaft having a largest-diameter part at said circumferential periphery at said large-diameter end thereof, said first keyway of said flywheel having a bottom is said flywheel that is parallel to and closer to said axis of rotation of said crank shaft than said largest-diameter part of said crank shaft at said large-diameter end of said tapered surface thereof to make said substantial length of said adjoining parts.

2. The device of claim 1, said key having a rounded surface on a side thereof adjacent said crank shaft, said second keyway for said key in said crank shaft having a rounded bottom surface corresponding to said rounded surface of said key, said key being held in an axial direction along said axis of rotation of said shaft by abutment of respective parts of said rounded surface of said key and said rounded bottom surface of said second keyway of said crankshaft.

* * * * *